Patented July 10, 1951

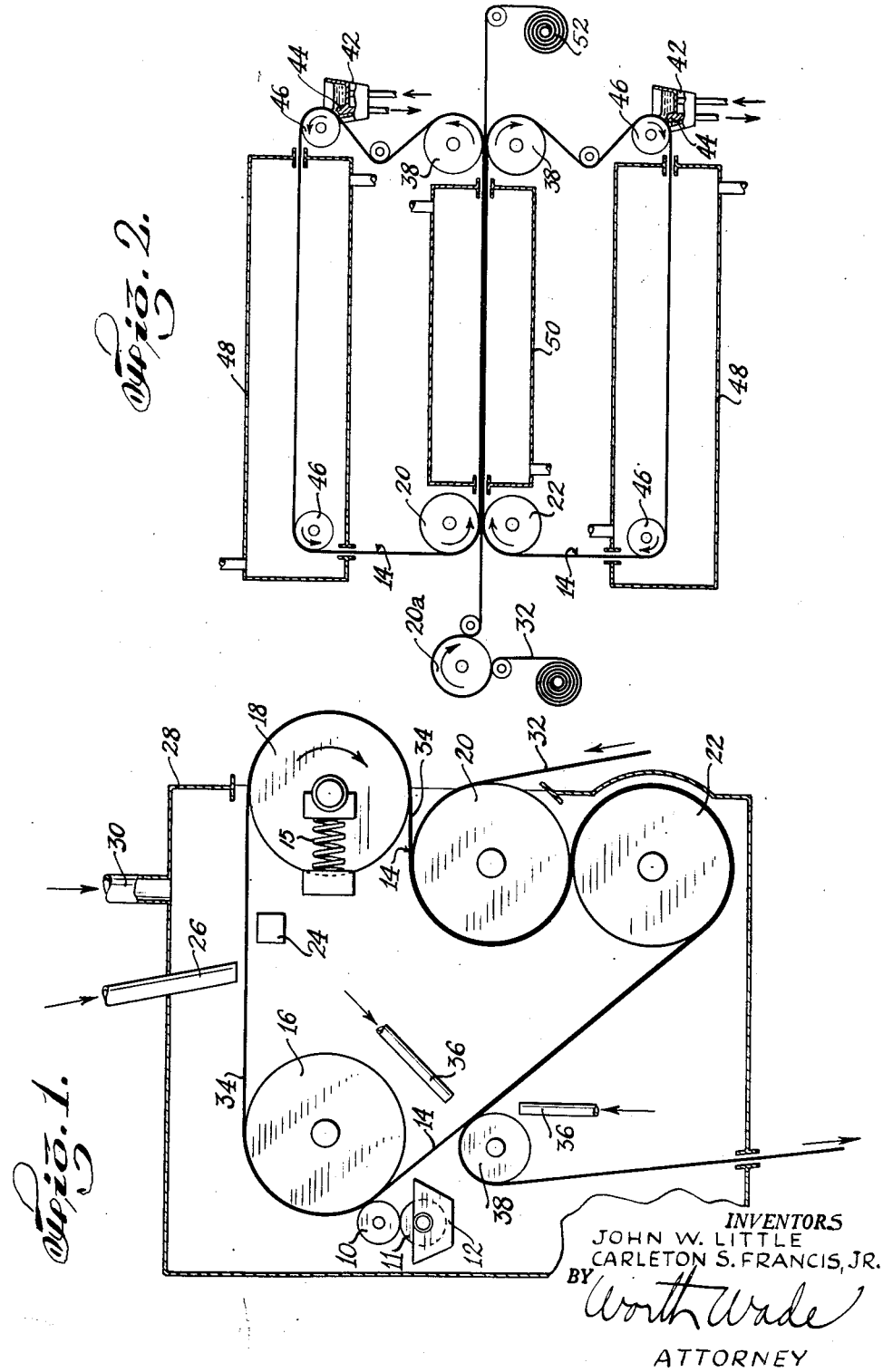

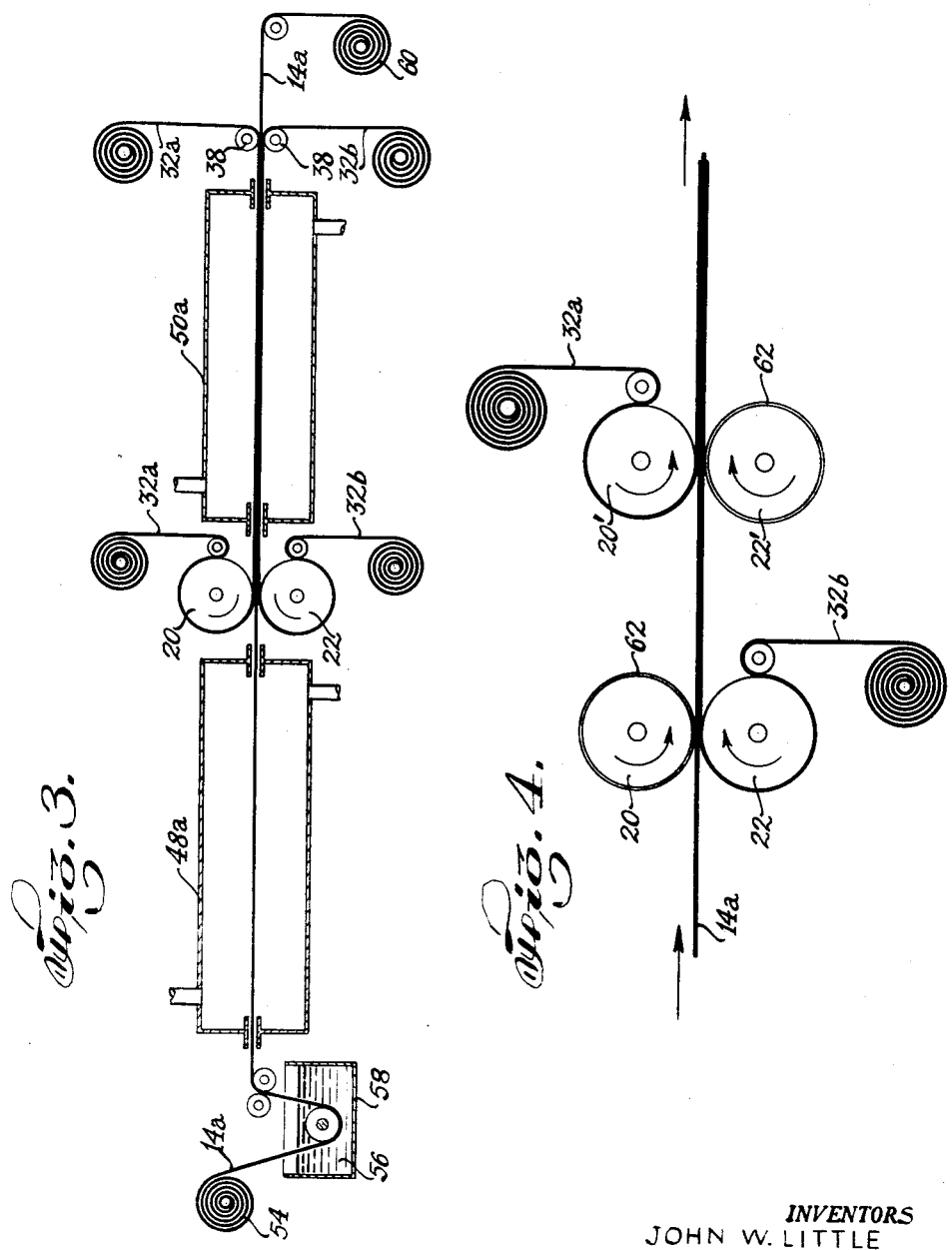

2,559,649

UNITED STATES PATENT OFFICE 2,559,649

PROCESS AND APPARATUS FOR TRANSFER COATING

John W. Little, Scarsdale, N. Y., and Carleton S. Francis, Jr., West Harwich, Mass., assignors, by mesne assignments, to American Viscose Corporation, Wilmington, Del., a corporation of Delaware Application May 9, 1944, Serial No. 534,728

3 Claims. (Cl. 154—97.5)

The present invention relates to transfer coating, and in particular it relates to a process and apparatus for the formation of thermoplastic films on a temporary support and their transfer to another surface.

Articles such as prints, photographs, documents, textiles and the like can be protected against defacement and at the same time be rendered more attractive and durable and the color, finish and/or stiffness of sheet materials may be varied by applying a coating of a suitable hardenable liquid to one or more faces of such articles. The use of such liquids, however, has been seriously limited since the presence of solvents and the like in such liquids has deleteriously affected the articles themselves as well as any configuration carried thereby and the presence of solvents has frequently caused swelling and/or disintegration of such articles. In an effort to overcome these difficulties, attempts have been made to apply such coatings in the form of relatively dry films formed of thermoplastic material.

It has been proposed to coat textiles, paper and other sheet materials by calendering a plastic mass to form a thick film, passing the film through a plurality of heated rolls to reduce its thickness, and then applying heat and pressure by means of the last heated roll to cause the film to adhere to a sheet material to be coated, and stripping the film from the last roll at the same point where heat and pressure is applied. In the practical application of this process a serious disadvantage immediately becomes apparent. In order that the plastic composition may be in a tacky state when applied to the sheet to be coated, it is essential that all the calender rolls through which the plastic film passes be heated, but the thermoplastic material, being thus rendered tacky, tends to adhere to and coat the heated rolls. Even if the sheet to be coated is rough, such as a fabric, so that the thermoplastic composition adheres to it more strongly than to the smooth surface of the calender roll, the best that can be expected is that the greater part of the thermoplastic composition will adhere to the fabric while some of the thermoplastic composition will remain on the heated applicator roll itself, impairing its smooth surface, impeding its operation, necessitating continuous cleaning of the roll and, in general, making the process practically inoperative.

In an attempt to obviate the disadvantages just mentioned another method of coating paper has been proposed wherein the paper is first coated with a layer of a wet adhesive, after which a very thin film of a cellulosic or rubber derivative carried on a heated drum is brought into contact with the wet adhesive layer on the paper and the film is united to the paper by means of the adhesive and the application of heat and pressure. This process has two disadvantages: (a) a double coating is necessary, e. g. the intermediate coating of adhesive and the top coating of a thin film bonded to the base by the adhesive, and (b) the presence of the intermediate coating of adhesive gives the finished product an undesirable stiffness which greatly limits the field in which the process can be utilized. Actually this process is not a method of transfer coating but merely a laminating operation.

In all said prior processes the stripping of the film from its temporary support has been effected substantially at the same point where heat and pressure were applied to the film. It has been found, however, that if the film is both caused to adhere and strip substantially at the same point there is a tendency for the film to show ripples and for the transfer to be imperfect.

Therefore, it is a general object of the present invention to provide a process and apparatus for forming a thin thermoplastic film upon a temporary support and for transferring such film directly to a surface to be coated by the sole action of heat and pressure.

It is a further object of the present invention to provide a process and apparatus for transfer coating in which the film, after transfer, separates completely and cleanly from the temporary support on which it was formed.

A specific object of the present invention is to provide a method and means for facilitating the stripping of a thermoplastic film from its temporary support in transfer coating.

Other objects and advantages of the invention, if not specifically pointed out, will be apparent to those skilled in the art as the description of the invention proceeds.

The process of the present invention comprises bringing a movable support carrying a thin thermoplastic film thereon into contact with a sheet material to be coated, applying heat and pressure to said sheet and said film while on said support to cause adhesion of the film to the sheet, cooling said adhered film prior to stripping, and thereafter stripping said sheet and film from said support at a point spaced from the point of application of heat and pressure.

The apparatus of the present invention comprises the combination of a movable film-casting surface, means for applying a flowable thermoplastic material to said surface to form a thin film, means for bringing a sheet to be coated into contact with the film on said movable surface, means for applying heat and pressure to said sheet and said film to force the film to adhere to said sheet, means disposed at a point spaced from the point of application of heat and pressure for stripping said sheet and film from said film-casting surface, and means for cooling said film between the point of application of heat and pressure and the point of stripping.

The invention accordingly comprises the process having the several steps and the relation of one or more of such steps with respect to each of the others, the apparatus embodying features of construction, combination and arrangement of parts adapted to effect such steps, all as exemplified in the detailed disclosure hereinafter set forth and the scope of the invention will be indicated in the claims.

For a more detailed description of the invention reference is made to the accompanying drawings in which Figures 1 is a representation in side elevation, partly in section, of one embodiment of an apparatus constructed in accordance with the invention and capable of carrying out the process of the invention;

Fig. 2 is a view in side elevation, partly in section, of a second embodiment of the apparatus of the invention;

Fig. 3 is a view in side elevation of a third embodiment of the apparatus of the invention whereby two separate sheets may be coated simultaneously; and Fig. 4 is a side elevation view of a modification of the transfer means of the apparatus illustrated in Fig. 3 whereby two separate sheets may be coated in sequence.

The film of the present invention may be formed from any suitable thermoplastic material such as thermoplastic cellulose derivatives as a class, including the organic solvent-soluble cellulose esters such, for example, as cellulose acetate, cellulose butyrate, nitrocellulose, also alkyl-, carboxy-alkyl-, and hydroxy-alkyl cellulose ethers of the types which are soluble in organic solvents, and the mixed ether-esters of cellulose, thermoplastic synthetic resins as a class, for example, polymers of vinyl acetate, vinyl chloride, vinylidene chloride, after-chlorinated vinyl polymers, such as the polyvinyl formals, acetals and butyrals, polystyrene, cumarone resins, indene resins, polyethene resins, resins formed from esters of acrylic acid and methacrylic acid, and the like; copolymers of vinyl chloride and vinyl acetate, copolymers of vinylidene chloride and vinyl chloride, copolymers of vinyl compounds and aldehydes, copolymers of vinyl halide and an acrylic acid derivative, and copolymers of vinyl compound and styrol compound; also thermosetting resins in the thermoplastic state as a class, such, for example, as phenol-aldehyde resins, urea-aldehyde resins, alkylated urea-aldehyde resins, melamine-aldehyde resins, sulfonamide-aldehyde resins, polyhydric alcohol-polybasic acid resins; resins of the type disclosed in U. S. Patent No. 1,991,810; drying oil-modified alkyd resins; resins formed from dicarboxylic acids and diamines (nylon type); synthetic elastomers as a class, such for example, as polymerized butadiene, e. g. Buna rubber, olefine-polysulfides, e. g. "Thiokol," isobutylene polymers, e. g. "Vistanex," chloroprene polymers, e. g. "Neoprene," and polyvinyl-halides, e. g. "Koroseal"; and also a mixture of synthetic resins, such, for example, as a mixture of vinyl resins and methacrylate resins, a mixture of olefine polysulfide resins and phenol-aldehyde resins, a mixture of a urea-aldehyde resin and a vinyl resin, or a mixture of two or more resins from the different classes just named.

The film-forming thermoplastic material may be dissolved in a suitable solvent, but is preferably dissolved in a solvent which is reasonably volatile so that it can be evaporated at a relatively low temperature. For example, a co-polymer of vinyl acetate and vinyl chloride may be dissolved in acetone or a mixture of toluol and butyl acetate. Other well known solvents for the film-forming materials, previously mentioned, may be used, if desired, as well as mixtures of these solvents. Alternatively, the thermoplastic material may be rendered flowable by melting, applied to the film-casting surface in a molten state and hardened by cooling.

The film-forming material may be plasticized with any one or a mixture of any of the well known plasticizers for thermoplastic materials commercially available. Such plasticizers are di-butyl phthalate, tri-cresyl phosphate and hexone. A plasticizer which has been found very satisfactory for use in connection with the vinyl co-polymers is sold commercially under the trade name of "Flexol 3-GH."

The thermoplastic film-forming material, after being formed into a flowable composition of suitable viscosity by the use of suitable solvents or by melting and plasticized in any desired manner well known to those skilled in the art, is suitably applied to a film-forming surface, described hereinafter and harened as by evaporating the solvents with air and/or heat. The film-forming surface with the film in position thereon is then placed in contact with the base to be coated and heat and pressure are applied to the base and film so as to produce adherence between the film and base, after which the film is stripped from the film-casting surface at a point spaced from the point of application of heat and pressure. Preferably, the film is cooled while still on said support because this facilitates uniform and rapid stripping.

The film-forming material may be applied to the film-casting surface by casting, spraying, painting, knifing-on, dipping, calendering or by picking up a film by means of surface tension. The thickness of the film so applied may be suitably controlled by varying the viscosity of the film-forming solution as by varying the solid content of the solution and/or suitably controlling the temperature of the molten material at the point of formation of the film.

The film-casting surface may be an endless surface such as an endless band or drum, or it may be a substantially continuous surface such as a long web which need not, however, be endless.

The film-casting surface may be formed from a suitable metal such as copper, steel, stainless steel, chromium or silver plated steel and the like, or may be formed in whole of or surfaced with a non-thermoplastic film-forming material, e. g. a paper, fabric or felt web coated with a non-thermoplastic substance which is not affected by the solvent of the film-forming material, preferably has no appreciable affinity for the film-forming material and which is capable of being finished to mirror-like smoothness. Suitable substances are cellulose hydrate, casein, gelatine and other hydrophilic colloids, or a non-thermoplastic resin, i. e. a thermosetting resin in the infusible state. The film-casting surface may also be formed from cellulosic material such as cellulose acetate, nitrocellulose and the like provided with a smooth surface which is not affected by the solvents of the film-forming solution such, for example, as by having the cellulosic band superficially treated to regenerate the cellulose at the surface, or, the band may be formed in its entirety from regenerated cellulose suitably regenerated in a well known manner from viscose or a solution of cellulose in suitable solvents such as cuprammonium, zinc chloride or a quaternary ammonium compound. From some aspects of the invention it is preferable that the band be formed of metal as previously explained since metal is more durable and thereby the necessity for replacing the band at frequent intervals is eliminated.

Also, it is necessary that the film-forming surface be exceedingly smooth so as to prevent the films from sticking to the surface. To this end, the band or drum is polished to mirror-like smoothness and is maintained in this condition by suitable cleaning and drying the surface at suitable periods. Since metal can be re-polished from time to time to form a surface of mirror-like smoothness without requiring further resurfacing, it is also preferable for this reason that metal be used.

A suitable apparatus constructed in accordance with the present invention and which is capable of use for practicing the process of the present invention is diagrammatically illustrated in Fig. 1, wherein an applicator roller 10 fed with thermoplastic material in solution from a roller 11 running in a bath of the solution in container 12 is used for applying the film-forming solution to a film-forming surface 14 in the form of an endless band.

The band 14 is supported by drums 16, 18, 20 and 22 which are suitably mounted for rotation and one or more of which are suitably driven in any desired manner to cause movement of the band 14 about the drums. The band 14 is held taut by suitable tensioning springs 15 which may be made adjustable in any well known manner.

After film-forming solution is applied to the band 14 to form a continuous film 34 it is suitably hardened by evaporation of the solvent by the use of air and/or heat. The heat may be supplied by any conventional form of heater 24 and/or by heating the drums 16 and 18 with internal electric coils or by passing steam or hot water through the drums in well known manner by instrumentalities not shown. Also, an air blast may be directed onto the film by a suitable nozzle, 26, if desired. The air from nozzle 26 may be heated or cooled in any desired manner to suitably regulate the temperature of the film on the band 14. In cases where solvent recovery is desired, the apparatus may be encased in a suitable jacket 28 which has the solvent vapor removed therefrom by a suitable conduit 30 leading to any desired form of conventional solvent recovery apparatus (not shown).

A suitable base which may be in the form of a web 32 is passed from a source of supply such as a roll to the drum 20 between this drum and the band 14 and in contact with the film 34 carried by the band. The drum 20 is heated either by electric coils of conventional type (not shown) suitably positioned adjacent to or within the drum 20 or by the passage of steam or hot water through the drum in any desired manner.

The band 14, the film 34 carried thereby and the base 32 pass in contact with the drum 20 and then between this drum and the drum 22 which are urged together by any suitable means such as a conventional adjustable spring, hydraulic or pneumatic mechanism (not shown). Any desired amount of heat and pressure are thereby applied to the film and the base 32 to cause the film to adhere to the base. As the base, film and band 14 pass from the drum 22, they are suitably cooled as by directing cool air against the same from suitable nozzles 36. The base 32 and film 34 are then passed around a stripping roller 38 to strip the film from the band 14. It has been found that superior results are obtained if the film is stripped from the band while the film is cool and non-tacky, since there is less tendency for the film to stick to the band under such conditions. Hence, the stripping roller 38 is spaced from the point of application of heat and pressure. The band 14 is provided with a smooth, hard and solvent-resistant surface, as previously explained, and since the degree of heat and pressure applied to the film to adhere it to the base 32 can be accurately controlled, it is possible by use of the present invention to apply an extremely thin film to the base 32 and continuously and rapidly strip the film from the band 14 after the film has adhered to the base.

That embodiment shown in Fig. 2 is especially designed for transferring and adhering a thermoplastic film to both surfaces of a common sheet material simultaneously and concurrently. Referring to Fig. 2 in this embodiment the sheet material 32 to be coated is preferably first passed about a heated roll 20a for the purpose of preheating and smoothing the sheet material. This roll also permits inspection of the sheet material just prior to transfer. Thereafter, the sheets are passed between the heated pressure rolls 20 and 22. There is also passed between the rolls 20 and 22 so as to enclose the sheet material 32, two endless film-casting bands 14, each carrying a thermoplastic film on its outer surface. The films may be formed on the bands 14 by suitable means such, for example, as a container 42 through which the flowable composition is adapted to be passed and flow over a weir 44, the overflow being brought into contact with the surface of the band 14 so that a thin film of the flowable composition is picked up on the band by surface tension.

Thereafter the band is passed by means of the rollers 46 through hardening chamber 48 wherein the film is rendered substantially dry and non-tacky, after which both bands are passed between the rollers 20 and 22 thus enclosing the sheet material 32. Means are provided for pressing the rolls 20 and 22 together so that the thermoplastic films are caused to adhere to the surface of the sheet material 32, the assembled bands and sheet material being carried, prior to stripping, through the cooling chamber 50 and then through the stripping rolls 38, the bands passing thereafter to the rolls 46 while the coated sheet material is wound up in a roll 52. In this apparatus it should be noted that means are provided for preheating the sheet material to be coated, for coating it on both surfaces simultaneously, for cooling the sheet and film prior to stripping, and thereafter for stripping the film-casting bands from the coated sheet material. It is to be understood that the endless bands 14 may be replaced by substantially continuous webs of thin metal foil, cellophane, or a fibrous sheet material coated with a non-thermoplastic smooth continuous coating, the web being coated, passed between the transfer rolls 20 and 22 and through the cooling chamber 50, through the stripping rolls 38 and then re-wound upon itself.

In Figure 3 there is shown another embodiment of the apparatus in which a thermoplastic film is formed on both sides of a single film-casting band, and the coated band thus produced utilized for transfer coating to separate sheet materials.

Referring to Fig. 3, the film-casting band which may be in the form of a continuous web 14a is unwound from the roll 54 and passed through the flowable composition 56 held in the container 58 so that the band is coated on both surfaces. The coated band is then passed through a hardening chamber 48a through which hot or cold air may be passed for evaporating the solvent or cooling the thermoplastic composition. The coated band is then passed between the heated transfer rolls 20 and 22 simultaneously with two separate sheets 32a and 32b of the material to be coated. These sheets are preferably pre-heated by causing them to pass into contact with a substantial portion of the surface of the respective heated transfer rolls 20 and 22. The band 14a, now carrying on each surface the thermoplastic film, and the sheet adhered thereto, is passed through the cooling chamber 50a and then between the stripping rolls 38 by means of which the coated sheet materials 32a and 32b are stripped from the band 14a which may then be wound up in the roll 60. The film-casting band 14a after one passage may be reused in the apparatus, or used for another purpose, or discarded as desired.

While in both Figs. 2 and 3 the thermoplastic films are shown as being transferred simultaneously by the same pair of heated calender rolls, it should be understood that the invention is not so limited and that the thermoplastic films may be transferred concurrently and continuously but at different spaced points. For example, as shown in Fig. 4, a film-casting band 14a carrying a thermoplastic film on each surface may be first passed between the heated calender rolls 20 and 22 where the film on the underside is transferred to the sheet material 32b after which the band carrying the coated sheet on one surface is passed through a second pair of heated calender rolls 20' and 22' by means of which the thermoplastic film on the upper surface of the band 14a is transferred to the sheet material 32a, after which the band carrying both sheet materials is cooled and the coated sheets stripped from the band 14a as heretofore described. In this embodiment it is necessary to avoid adhesion of the exposed thermoplastic film to that calender roll which is not covered with a sheet material to be coated. To accomplish this the heated rolls 20 and 22' which would contact the exposed thermoplastic film are preferably protected from direct contact with the film by interposing a layer of non-thermoplastic sheet material between the surface of the roll and the film. In the simplest embodiment this is accomplished by pressing over the rolls 20 and 22' a seamless tubing 62 of regenerated cellulose of the type used for artificial sausage casings, as such hydrophilic material shows no tendency to adhere permanently to the thermoplastic films. Alternatively, these rolls may be coated with a non-thermoplastic resin, i. e., a thermosetting resin in the infusible state. Another means for decreasing the tendency of the exposed rolls to adhere to the exposed films is to maintain these rolls at a lower temperature than the thermal tacking point of the particular film employed. In this case the rolls 20 and 22 which are covered with the sheet materials may be maintained at a higher temperature than the thermal tacking point.

In the apparatus illustrated in Fig. 1 the film 34 and the base 32 are held in tight contact during the heating period by the band 14 passing in contact with the base 32 over a major portion of the periphery of the drum 20. Additional drums may be provided, if desired, to hold the film and base in contact for a longer period.

The present invention makes it possible to transfer films of such thinness as to be unable to support their own weight and which could not, therefore, be formed as separate films. The thickness of the film coating is preferably controlled as previously explained, having regard to the hardness and flexibility of the film-forming material, so that the film and the base sheet will be in substantial equilibrium in the finished article. That is, the thickness of the film is so proportioned to the thickness of the base sheet, taking into consideration the physical characteristics of each, that the base sheet cannot be warped or otherwise distorted by any change in the size of the film, but will always be flat or retain the shape into which it is formed in the finished article.

The process and apparatus of the present invention make it possible to form and transfer continuously extremely thin films which may be advantageously used to enhance the appearance of photographs, prints and the like since the film can be used to increase the reflective index of the surfaces of such prints or photographs as well as to bring out details of the latter. In addition to enhancing the appearance of such articles, the film can be used to form a moisture and/or grease-proof protective coating and also protect the prints or photographs from defacement.

Suitable coloring materials such as pigments and/or dyes may be applied to the film-forming material to tone, color or neutralize colors so as to vary the appearance of prints, photographs and the like. If desired, suitable indicia and/or other configurations may be applied to the film prior to adherence of the same to the base sheet as, for example, by printing suitable indicia and/or configurations onto the side of the film which is adhered to the base by a conventional printing roll (not shown).

The thermoplastic material may be applied uniformly to the casting surface to form a continuous film, or it may be applied in predetermined areas to form indicia, decorations, stripes and the like. For example, in Fig. 1 the applicator roll 10 may be a printing roll. The indicia and/or configurations will be printed onto the film in the reverse position to the normal viewing position since the indicia and/or configurations will be viewed through the film. In this case, the film material should be transparent or sufficiently translucent to enable the indicia and/or configurations to be viewed therethrough.

The surface of band 14 may be provided with suitable engravings which are filled by the film-forming material to form raised configurations and the like which appear on the surface of the finished article, or the band 14 may be provided with slightly raised indicia and/or configurations which give a design in the film the appearance of a buffed watermark. In lieu of or in addition to this, the roller 20 may be provided with raised areas in the form of indicia, configurations and the like so as to emboss the base sheet and the film in the finished article.

If desired, the apparatus illustrated in Fig. 1 may be placed immediately adjacent printing apparatus for printing suitable indicia and/or configurations on the base sheet 32. By selecting printing inks having selective wetting characteristics so that the inks wet the base sheet 32 but do not appreciably wet the film 34, the latter may be applied over the ink before the ink is entirely dry to thereby dispense with the necessity for passing the base 32 through dryers or the like prior to the application of the coating film.

Textile fabrics, metal, wood veneer, leather, wall paper, and similar materials may be coated by the use of the present invention to change their surface characteristics and/or to strengthen them. The degree of penetration of the coating material into the base sheet may be suitably controlled to form a product in which the thermoplastic coating is continuous on the surface or to form a product in which the thermoplastic material is dispersed partially in or throughout the base sheet. When fabrics are impregnated the thermoplastic material adheres the fibres together so as to strengthen and/or stiffen the fabric. For example, penetration may be effected either by (a) using higher temperatures and pressures or (b) by transferring the film while the film is still tacky by reason of retaining residual solvents.

Since certain changes may be made in carrying out the above process and in the product, and modifications effected in the apparatus for practicing the principle thereof, without departing from the scope of the invention, it is intended that all matter contained in the above description or shown in the accompanying drawings shall be interpreted as illustrative and not in a limiting sense.

This application is a continuation-in-part of our U. S. application Serial No. 341,450, filed June 20, 1940, now abandoned.

Having described our invention, what we claim as new and desire to secure by Letters Patent is:

1. A film-casting apparatus for continuously forming a thin film upon a film-casting surface, adhering it to a sheet to be coated and stripping it from the film-casting surface comprising, in combination, a moveable support, means for applying a flowable thermoplastic composition to both surfaces of the support, means for hardening said composition to form a thin film, means for bringing a sheet to be coated into contact with the film on one surface of the support, means for applying heat and pressure to said film and said sheet to force the film to adhere to the sheet, means for bringing a second sheet to be coated into contact with the film on the other surface of the support, means for applying heat and pressure to the second film and the second sheet to force the film to adhere to the sheet, means for cooling both films at a point spaced from the point of application of heat and pressure and means for stripping each of said films and sheets from the endless support.

2. A film-casting apparatus for continuously forming a thin film upon a film-casting surface, adhering it to a sheet to be coated and stripping it from the film-casting surface comprising, in combination, a moveable support, means for applying a flowable thermoplastic composition to both surfaces of the support, means for hardening said composition to form a thin film, means for simultaneously bringing two sheets to be coated into contact with each of the films on said surfaces, means for applying heat and pressure to said films and said sheets to force the films to adhere to the sheets, means for cooling the films at a point spaced from the point of application of heat and pressure and means for stripping the films and sheets from the support.

3. The continuous process of forming a thin film upon a casting surface, adhering it to a sheet to be coated and stripping it from the surface, comprising, in combination, the steps of successively casting a thin film upon both sides of a moveable support, passing said support into simultaneous contact with two sheets to be coated, applying heat and pressure to the film and the sheets, forcing the film to adhere to the sheets, cooling the film and the sheets at a point spaced from the point of application of heat and pressure to render the film non-tacky, and then stripping the sheets from the moveable support.

JOHN W. LITTLE.
CARLETON S. FRANCIS, JR.

REFERENCES CITED

The following references are of record in the file of this patent:

UNITED STATES PATENTS

| Number | Name | Date |
|---|---|---|
| 2,070,600 | Jenett | Feb. 16, 1937 |
| 2,169,288 | Reynolds | Aug. 15, 1939 |
| 2,175,125 | Mack | Oct. 3, 1939 |
| 2,236,766 | Schneider | Apr. 1, 1941 |
| 2,274,706 | Keim | Mar. 3, 1942 |
| 2,275,957 | Groff | Mar. 10, 1942 |
| 2,288,188 | Grupe | June 30, 1942 |
| 2,315,477 | Parkhurst | Mar. 30, 1943 |